March 17, 1931.  H. D. McBRIDE ET AL  1,796,606
GRASS TRIMMER
Filed April 6, 1929
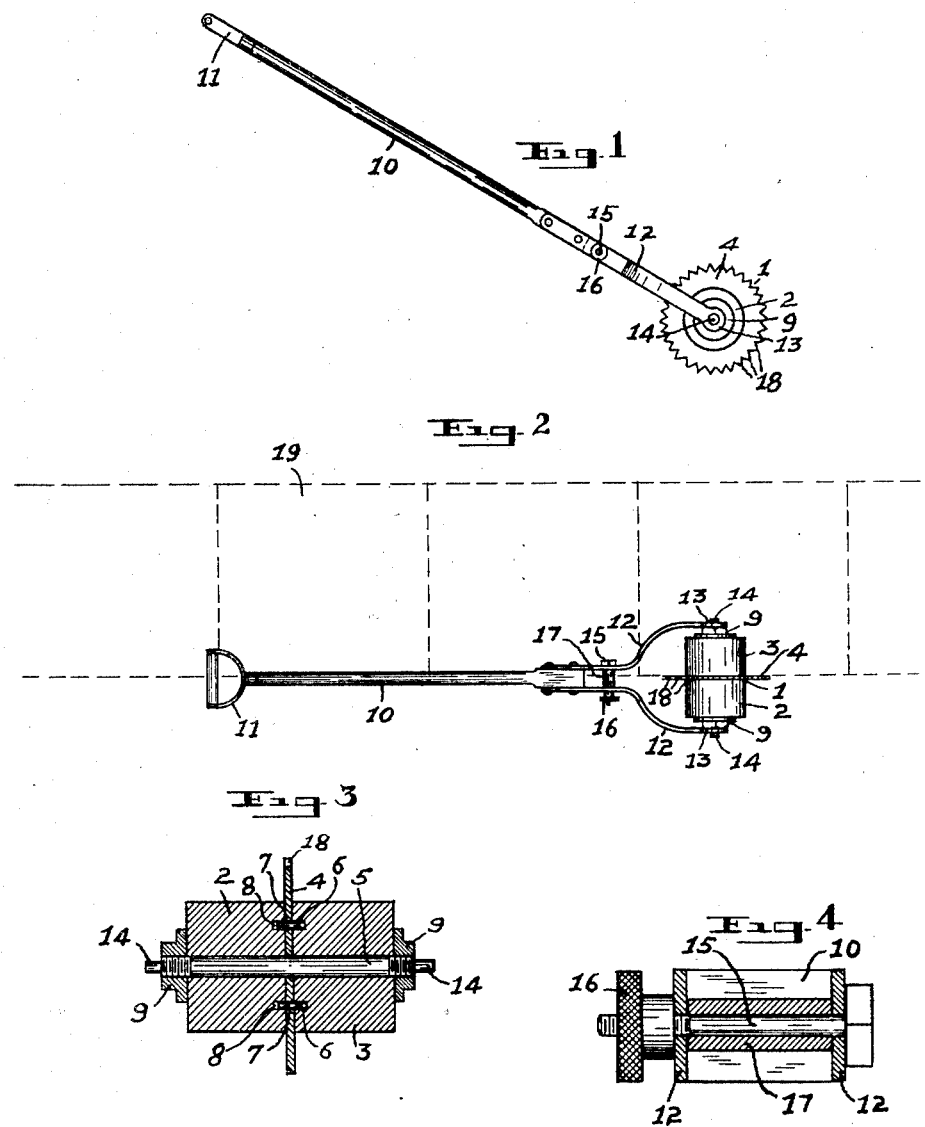

Patented Mar. 17, 1931 1,796,606

UNITED STATES PATENT OFFICE

HERBERT D. McBRIDE, OF BELLEVUE, AND JOHN S. CAMPBELL, OF PITTSBURGH, PENNSYLVANIA

GRASS TRIMMER

Application filed April 6, 1929. Serial No. 353,024.

Our invention relates to a grass trimmer and while primarily intended for trimming grass, along the side edges of side walks that cannot be cut by a lawn mower, it is obvious that the device may be employed for any other purposes wherein it is found to be applicable.

Important objects of the invention are to provide a device of the character described which is readily operable for trimming grass along the side edges of side walks, which is simple in its construction and arrangement, strong, durable and efficient in its use, and comparatively inexpensive to manufacture.

With the foregoing and other objects in view which will appear as the description proceeds, the invention resides in the combination and arrangement of parts and in the details of construction hereinafter described and claimed, it being understood that changes in the precise embodiment of the invention hereinafter disclosed can be made within the scope of what is claimed without departing from the spirit of the invention.

In the drawing wherein like numerals of reference designate corresponding parts throughout the several views:—

Figure 1 is a side elevational view of a grass trimmer constructed in accordance with the invention.

Figure 2 is a top plan view thereof illustrating its operative position relative to a side walk.

Figure 3 is an enlarged, longitudinal cross sectional view of the rotor element.

Figure 4 is an enlarged view of the handle attaching elements, partly in cross section.

Referring in detail to the drawing 1 denotes the rotor element of our improved grass trimmer. The rotor element 1 consists of a pair of rollers 2 and 3, which brace and are disposed on respective sides of the cutting disk 4 on a horizontally extending shaft 5.

The inner end of the roller 3 carries a pair of fixed diametrically opposed pins 6, which project through the registering perforations 7 formed in the cutting disk 4, and into the registering apertures 8 formed on the inner end of the other roller 2.

The rollers 2 and 3, with the interposed cutting disk 4, are joined together by the pins 6, in the manner above described, to assure their unitary rotation with the shaft 5.

The rotor element 1 is secured to the shaft 5 by a pair of nuts 9, which are threadedly mounted on the shaft 5 and engage the outer ends of respective rollers 2 and 3.

The rotor element 1 is operated by a handle 10. The latter is provided with a hand hold 11 at its rear free end and carries a pair of resilient, forwardly projecting, connecting arms 12, which are fixed to the forward end of the handle 10.

The forward ends of the connecting arms 12 are formed to provide bearings 13, which are adapted for detachable engagement with respective projecting ends 14 of the shaft 5.

The normal resilient actions of the arms 12 tend to spread the latter apart and from their connections with respective shaft ends 14. The arms 12 are drawn together to maintain the bearings 13 in their proper engagement with respective shaft ends 14 by a draw bolt 15 and an associated thumb nut 16. The bolt 15 extends through the arms 12 and a spacing sleeve 17 is mounted on the bolt 15 intermediate of the arms 12.

When the arms 12 are drawn together, to the distance permitted by the interposed spacing sleeve 17, by the adjustment of the nut 16 on the bolt 15, the bearings 13 will be properly positioned to permit of the free rotation of the rotor element 1 in the connecting arms 12 without any deterrent binding action.

The attachment of the rotor element 1 with the arms 12, in the manner stated, facilitates the removal of the former from the latter when required.

The rollers 2 and 3 are of uniform diameters and the cutting disk 4 is considerably greater in diameter, whereby, when the rollers 2 and 3 and the cutting disk 4 are assembled, as described, the periphery of the latter will project at some distance beyond the peripheries of the former.

The periphery of the cutting disk 4 is preferably, though not essentially, formed with cutting teeth 18.

It is a well known fact, that when cutting grass on a lawn with an ordinary lawn mower, it is impossible to reach and cut the grass which is close to and overlapping the side edges of any side walks traversing the lawns. The purpose of the present invention is to provide a conveniently operable device for removing any grass contiguous to or overlapping the side edges of said walks.

In practice the cutting disk 4 is pushed forwardly along the side edges of a side walk 19 in the position clearly shown in Figure 2. The cutting disk 4 will cleave any overlapping grass, while the rollers 2 and 3 will facilitate the propulsion of the device and further serve to break down any engaged grass to the level plane of the lawn.

The use of our improved grass trimmer provides a most efficient device for cleanly trimming and removing any grass along the side edges of side walks and obviates the necessity of cutting such grass with ordinary shears as now required.

What we claim is:

In combination, a grass trimmer of the character described comprising a shaft, a cutting disk provided with perforations mounted on said shaft, a pair of rollers mounted on said shaft and disposed on respective sides of said cutting disk, pins engaging said pair of rollers and extending through said cutting disk, a pair of nuts threadedly mounted on said shaft and respectively engaging said pair of rollers for securing the latter to said shaft, a handle, a pair of resilient connecting arms fixed to said handle and being pivotally connected on respective ends of said shaft, a spacing sleeve disposed between said pair of connecting arms and rearwardly of said cutting disk, and a bolt extending through the latter and through said spacing sleeve for detachably securing said pair of connecting arms with respective ends of said shaft.

In testimony whereof we affix our signatures.

HERBERT D. McBRIDE.
JOHN S. CAMPBELL.